(12) United States Patent
Beerana

(10) Patent No.: US 10,628,179 B2
(45) Date of Patent: Apr. 21, 2020

(54) UNIVERSAL GRAPHICAL USER INTERFACE OBJECTS

(71) Applicant: Microsoft Technology Licensing, LLC, Redmond, WA (US)

(72) Inventor: Somasundaram Beerana, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 424 days.

(21) Appl. No.: 15/599,812

(22) Filed: May 19, 2017

(65) Prior Publication Data

US 2018/0335940 A1    Nov. 22, 2018

(51) Int. Cl.
*G06F 9/451*    (2018.01)
*G06F 8/38*    (2018.01)

(52) U.S. Cl.
CPC ............... *G06F 9/451* (2018.02); *G06F 8/38* (2013.01)

(58) Field of Classification Search
CPC ...... G06F 9/451; G06F 3/0481; G06F 3/0482; G06F 3/04842; G06F 3/04847; G06F 8/38
See application file for complete search history.

(56) References Cited

U.S. PATENT DOCUMENTS

| | | | |
|---|---|---|---|
| 6,809,741 B1 | 10/2004 | Bates et al. | |
| 8,205,156 B2 | 6/2012 | Gibson et al. | |
| 8,441,499 B2 | 5/2013 | Heynen et al. | |
| 8,514,242 B2 | 8/2013 | Luengen et al. | |
| 8,826,146 B2 | 9/2014 | Luther et al. | |
| 9,696,967 B2 * | 7/2017 | Balasubramanian et al. | G06F 8/38 |
| 10,152,804 B2 * | 12/2018 | Strong | G06T 11/001 |
| 2002/0052721 A1 * | 5/2002 | Ruff | G06F 9/451 703/1 |
| 2006/0059430 A1 * | 3/2006 | Bells | G06F 3/0481 715/747 |
| 2007/0270669 A1 | 11/2007 | Pamagian | |

(Continued)

FOREIGN PATENT DOCUMENTS

CN    106055235 A    10/2016

OTHER PUBLICATIONS

Thayer, Weston, "High Contrast in XAML", http://westonthayer.com/writing/2014/11/21/high-contrast-in-xaml/, Published on: Nov. 21, 2014, 7 pages.

(Continued)

*Primary Examiner* — Justin S Lee
(74) *Attorney, Agent, or Firm* — Schwegman Lundberg & Woessner, P.A.

(57) ABSTRACT

Systems and methods are disclosed to provide graphical user interface (UI) elements that automatically change appearance according to system-wide global settings, such as a high contrast accessibility mode and/or a telemetry mode. The systems and methods enable such functionality by segregating program code for UI elements between presentation settings and functional logic. For instance, global HC color settings and/or global telemetry settings may be configured in an inheritable portion of an encoding for graphical UI elements. When system-wide mode changes are detected, such as selection of a high contrast theme and/or a telemetry mode, global HC color settings and/or global telemetry settings may automatically override custom settings for UI elements.

20 Claims, 15 Drawing Sheets

(56) References Cited

U.S. PATENT DOCUMENTS

| | | | |
|---|---|---|---|
| 2008/0079750 A1 | 4/2008 | Setlur | |
| 2012/0127198 A1 | 5/2012 | Gundavarapu | |
| 2012/0212501 A1* | 8/2012 | Berkland | G06F 9/451 345/593 |
| 2012/0304109 A1* | 11/2012 | Herberger | G11B 27/034 715/782 |
| 2013/0318456 A1* | 11/2013 | Lacey | G06F 8/38 715/765 |
| 2015/0074546 A1* | 3/2015 | Slawson | G06F 3/0484 715/747 |
| 2015/0082208 A1* | 3/2015 | Klinger | G06F 3/04847 715/762 |
| 2015/0149891 A1* | 5/2015 | Magistrado | G06F 17/2247 715/235 |
| 2017/0109029 A1* | 4/2017 | Lee | G09G 5/06 |
| 2017/0293479 A1* | 10/2017 | Kumar | G06F 9/451 |

OTHER PUBLICATIONS

"Using Light, Color and Contrast Effectively in UI Design", http://usabilitypost.com/2008/08/14/using-light-color-and-contrast-effectively-in-ui-design/, Published on: Aug. 14, 2008, 4 pages.

* cited by examiner

```
MyButton.xaml.cs (in part)                                      ⌐502
namespace abc {
    public sealed partial class MyButton : Button, INotifyPropertyChanged    {
        ...
        private void AccessibilitySettings_HighContrastChanged(AccessibilitySettings
sender, object args)    {
                if (accessibilitySettings.HighContrast)
                    Background = Resources["MyButtonHighContrastBackgroundBrush"];
                else // dependencyProperty
                    Background = GetValue(BackgroundBrushProperty);
        ...  }   ...     } }
```

```
MyButton.xaml (in part)                                         ⌐504
<Button x:Class="...">
<Button.Resources>
    <SolidColorBrush x:Key="MyButtonHighContrastBackgroundBrush"
Color="{ThemeResource SystemColorWindowColor}" />
</Button.Resources> </Button>
```

```
MyButtonStyle.xaml (in part)                                    ⌐506
<ResourceDictionary xmlns="http://..." >
  <Style  x:Key="MyButtonBaseStyle" TargetType="local:MyButton">
    <Setter Property="Template">
      <Setter.Value>
        <ControlTemplate>
          <ContentPresenter x:Name="MyButtonContentPresenter"
                Background="{Binding Background, ReleativeSource={Relative Source
TemplatedParent}}"  ... />
        </ControlTemplate>
      </Setter.Value>
    </Setter>
  </Style>
  <Style  x:Key="MyColoredBaseStyle" BasedOn="{StaticResource MyBaseStyle}"
TargetType="local:MyButton">
    <Setter Property="Background" Value="{StaticResource MyBackgroundColor}" />
  </Style>
  <Style x:Key="EllipticalStyle" BasedOn="{StaticResource MyColoredBaseStyle}"
TargetType="local:MyButton">
    <Setter Property="CornerRadius" Value="19" />
  </Style>
</ResourceDictionary>
```

FIG. 5

UNIVERSAL GRAPHICAL USER INTERFACE OBJECTS

BACKGROUND

Use of accessibility features on computing devices and equipment has become widely available. For example, high contrast (HC) color theme settings are available for users with disabilities recognizing contrasts between colors. The programming environment for developing applications with graphical user interfaces has evolved rapidly, providing both flexibility and consistency to application developers for customizing graphical user interface (UI) objects and elements such as menus and buttons with ease. Various properties of graphical UI objects, such as but not limited to shapes and colors, are customizable by application developers.

Recent user interface technologies empower application developers and application UI designers to refine and customize colors for many different types of objects (e.g., menus, ribbons, buttons, etc.) as well as in response to different user actions (e.g., point-over, select/unselect, etc.) on these objects. Requirements based on system-level modes such as accessibility and HC theme mode settings, however, continue to require applications to be compliant with providing high contrast color when necessary. Such system-level requirements may be burdensome for developers by increasing code demands at the application level. Currently, designers and developers extensively customize GUI elements to match rich content presentations. On top of coding these highly customized elements, developers must also create high contrast versions of the elements. Similarly, other system-level modes, such as a telemetry feature, cause coding issues for application developers.

It is with respect to these and other general considerations that the aspects disclosed herein have been made. Also, although relatively specific problems may be discussed, it should be understood that the examples should not be limited to solving the specific problems identified in the background or elsewhere in this disclosure.

SUMMARY

According to the present disclosure, the above and other issues may be resolved by providing a base section of program code on a base UI object configured to monitor changes in a color theme mode. In this way, when a change in theme is detected, UI objects containing such code may be automatically rendered in high contrast colors. Moreover, custom color settings for a UI element as specified by custom sections of the program code may automatically be overridden by the base section. In the present disclosure, system-wide theme settings, such as high contrast colors, may be automatically enforced on individual UI objects and elements, while retaining design versatility and flexibility, such as but not limited to custom styles, colors and shapes of graphical UI elements, for developers.

In aspects, a computer system is provided. The computer system includes at least one processing unit and at least one memory storing computer executable instructions that, when executed by the at least one processing unit, cause the computer system to perform a method. The method includes providing an element on a graphical user interface, where the element is encoded with one or more global settings that are operable to override custom settings. The method further includes encoding the element with a custom color setting and displaying the element using the custom color setting. Additionally, the method includes receiving an indication to change a theme of the graphical user interface, where the theme is associated with a color scheme for the graphical user interface and, in response to receiving the change to the theme, automatically overriding the custom color setting of the element with a global color setting associated with the theme. The method also includes displaying the element in the graphical user interface using the global color setting.

In further aspects, a computer-implemented method for updating a graphical user interface (UI) element based on a theme change is provided. The method includes providing an element on a graphical user interface, where the element is encoded with one or more global settings that are operable to override custom settings. The method further includes encoding the element with a custom color setting and displaying the element using the custom color setting. Additionally, the method includes receiving an indication to change a theme of the graphical user interface, where the theme is associated with a color scheme for the graphical user interface and, in response to receiving the change to the theme, automatically overriding the custom color setting of the element with a global color setting associated with the theme. The method also includes displaying the element in the graphical user interface using the global color setting.

In still further aspects, a computer storage medium is provided. The computer storage medium includes computer-executable instructions that when executed by a processor perform a method of updating at least one user interface (UI) element based on a theme change. The method includes providing an element on a graphical user interface, where the element is encoded with one or more global settings that are operable to override custom settings. The method further includes encoding the element with a custom color setting and displaying the element using the custom color setting. Additionally, the method includes receiving an indication to change a theme of the graphical user interface, where the theme is associated with a color scheme for the graphical user interface and, in response to receiving the change to the theme, automatically overriding the custom color setting of the element with a global color setting associated with the theme. The method also includes displaying the element in the graphical user interface using the global color setting.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Additional aspects, features, and/or advantages of examples will be set forth in part in the description which follows and, in part, will be apparent from the description, or may be learned by practice of the disclosure.

BRIEF DESCRIPTION OF THE DRAWINGS

Non-limiting and non-exhaustive examples are described with reference to the following figures.

FIG. 5 depicts schematic code samples for a graphical UI element encoded using universal button code, according to an example.

DETAILED DESCRIPTION

Figure 1A:
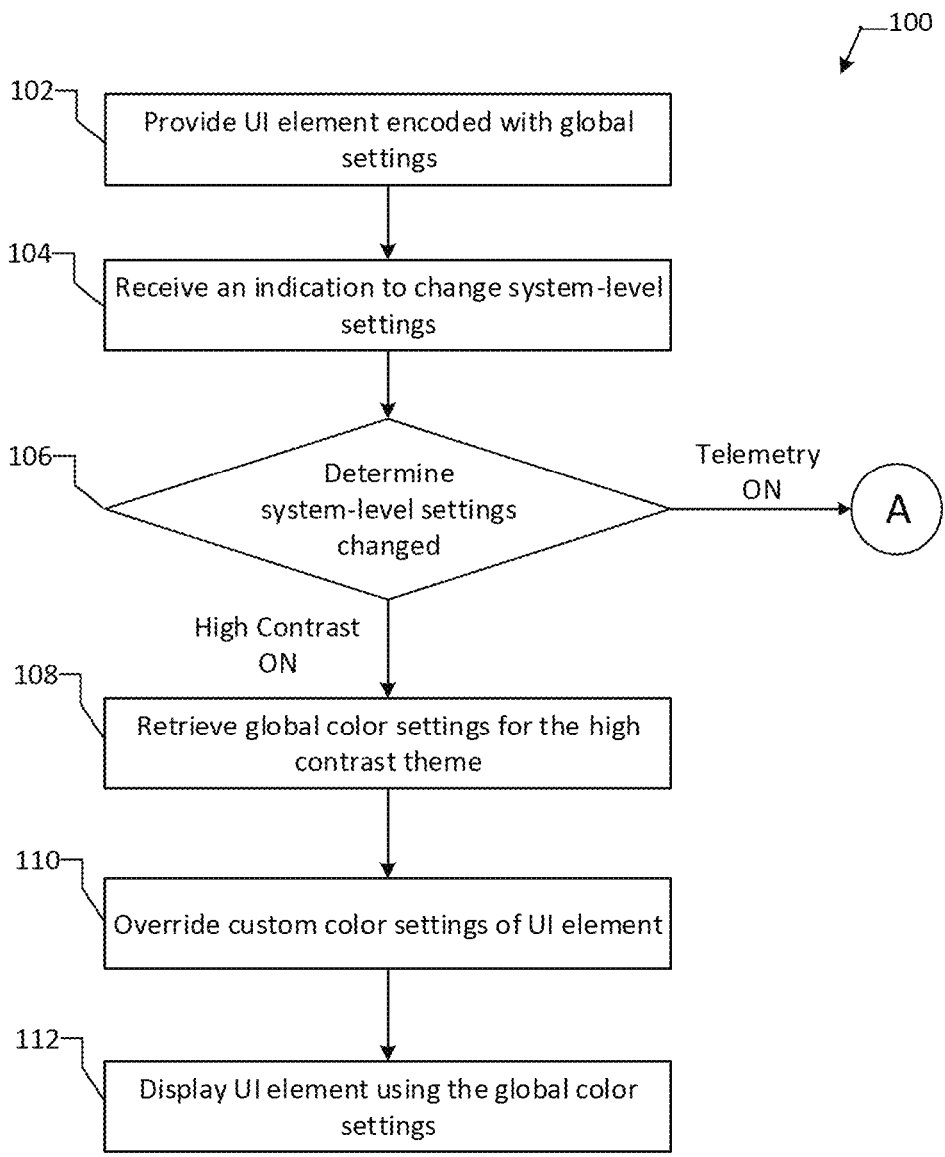
FIGS. 1A and 1B illustrate a method for automatically overriding custom properties of at least one graphical user interface element when global system settings are changed to a high contrast (HC) theme or telemetry.

Various aspects of the disclosure are described more fully below with reference to the accompanying drawings, which form a part hereof, and which show specific exemplary aspects. However, different aspects of the disclosure may be implemented in many different forms and should not be construed as limited to the aspects set forth herein; rather, these aspects are provided so that this disclosure will be thorough and complete, and will fully convey the scope of the aspects to those skilled in the art. Aspects may be practiced as methods, systems or devices. Accordingly, aspects may take the form of an entirely hardware implementation, a software implementation or an implementation combining software and hardware aspects. The following detailed description is, therefore, not to be taken in a limiting sense.

Recent technology enables computing systems and devices to render scalable text and two-dimensional or three-dimensional images with animations. Such advancements in graphical rendering have been followed by an evolution of graphical user interface (GUI) design and functionality that improve user interaction with the graphically-rich content. Accordingly, as GUIs have become more complex, technologies for software architecture have evolved to enable graphics designers to design and develop custom appearances for graphically-rich applications, while programmers collaborate on coding controls and other logical aspects of such complex applications. For example, Windows® Presentation Framework (WPF) enables application UI designers to create graphically-rich appearances of GUI elements and applications by coding in Extensible Application Markup Language (XAML), while also enabling programmers to code controls and other logic using programming languages such as C#. In response to consumer and industry demands to match the appearance of GUI elements (e.g., buttons and other widgets) with other graphically rich content, it has become common for graphic designers to refine and customize the visual appearance of GUI elements (e.g., style, shape, color, texture, contrast, etc.) to match other graphical content on a webpage or other graphical rendering. However, traditional technologies for streamlining object development and coding, such as inheritance encapsulation and polymorphism, are not available due to the customized nature of current graphical user interface elements.

As computing systems and devices have become widely available and arguably essential, there has been a strong need to facilitate accessibility to a wide range of users with different capabilities. For example, some users are visually impaired and are unable to discern at least some types of content unless it is rendered in high contrast (HC). GUI elements rendered in colors with low contrasts may be indistinguishable and, thus, unusable by such users. Accordingly, it has become common for computing systems and devices to provide an accessibility mode (e.g., a high contrast (HC) theme) at the operating-system level. When the HC theme has been selected, frames, common components of various windows, and common menus are rendered in high contrast colors instead of based on a default (or normal) theme provided by the operating system. However, in order to provide such HC features, each GUI element must be coded with HC settings.

Systems and methods are disclosed to provide graphical user interface (UI) elements that automatically change appearance according to system-wide global settings, such as a high contrast accessibility mode and/or a telemetry setting. The systems and methods enable such functionality by segregating program code for UI elements between presentation settings and functional logic. As should be appreciated, with the recent advances in UI design and development described above, there has been an increasing burden for the UI designers to create customized GUI elements that are compatible with graphical content presented in either a default mode (non-HC theme) or in the HC theme. Indeed, this has traditionally required developers to customize code for each element based on each potential mode or theme. Thus, additional coding has been required at the presentation/view layer to accommodate custom styles and color settings for the various system-wide modes, including the HC theme. In aspects, rendering GUI elements in high contrast (e.g., based on color settings that are distinguishable by vision impaired users) may generally be related to a presentation layer of an application, and may not be integral to the logic or functionality of associated GUI elements. Thus, there has been a need for a new technology that strikes a balance between empowering UI designers to create graphically rich content while reducing coding overhead. In response to these needs and according to aspects described herein, global HC color settings may be configured in an inheritable portion of an encoding for graphical UI elements.

In a different but related example, computing systems and devices are increasingly used in a connected environment over networks such as the Internet. Thus, it has become common to remotely manage security, system performance and service quality for computer systems, devices and application programs. Telemetry features have been made available to enable systematically collecting information from computer systems and devices at remote locations. Telemetry features may be used for a variety of purposes. For example, software vendors may use telemetry features to remotely collect information on versions of hardware and software installed on computer systems and devices and to update the software as needed to maintain software quality.

Similar to global HC color settings, global telemetry settings may be configured in an inheritable portion of an encoding for graphical UI elements.

Figure 1B:
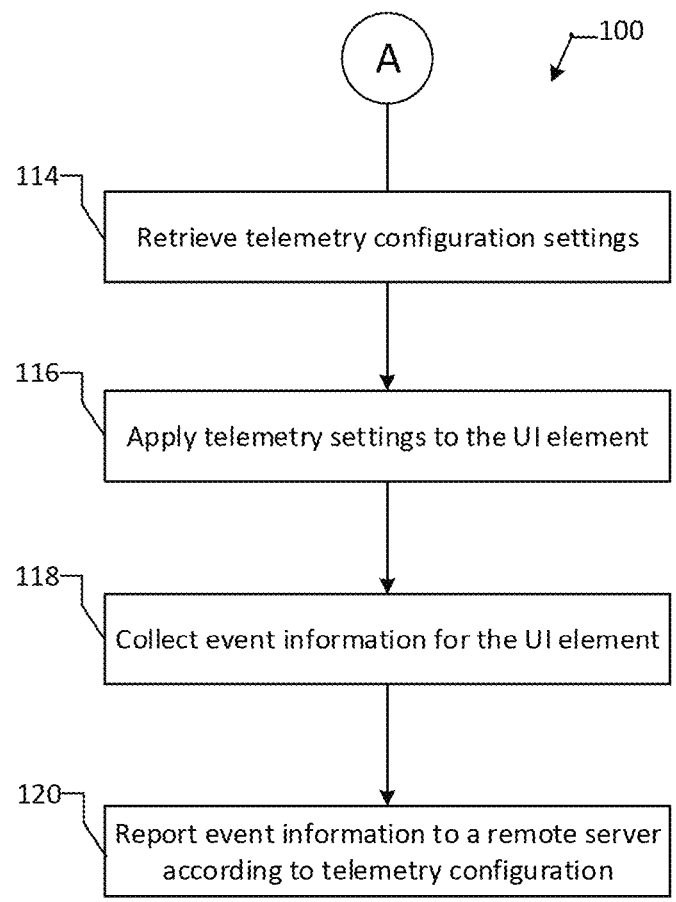

FIGS. 1A and 1B illustrate a method for automatically overriding custom properties of at least one graphical user interface element when global system settings are changed to a high contrast (HC) theme or telemetry. For instance, the method 100 may be implemented on graphical user interface of a computing device in which graphical UI objects are provided for user interactions.

At provide operation 102, one or more graphical UI objects may be provided that are encoded with one or more global settings. In aspects, a graphical UI object may refer to any UI element provided by a graphical user interface, including interactive buttons, ribbons or other widgets. For example, the global settings may include global color settings to be applied to the one or more graphical UI objects under certain system conditions. The global color settings may include one or more high contrast color schemes for making the graphical UI elements more visible to visually impaired users of computing devices. When system-level settings are set to a high-contrast (HC) theme, the global color settings encoded for at least one UI element may be implemented to provide the UI element in a HC color according to a HC color scheme. In other examples, the global settings may include telemetry settings for sending information to a remote data collection site. When system-level settings are set to telemetry ON, the telemetry settings encoded for at least one UI element may be implemented to collect and report user interaction events with the at least one UI element to a remote server for further processing. In aspects, the at least one UI element is also encoded with custom color settings. For example, when system-level settings are set to a "normal" theme, the custom color settings may be used by the graphical user interface to render various states of the at least one UI element. The custom color settings may specify custom colors for foreground, background, pointer-over foreground, pointer-over background, selected foreground, selected background, disabled foreground, disabled background, and the like. In aspects, there may be more than one HC theme available for selection.

At receive operation 104, an indication to change system-level settings may be received. The indication may be generated through user or administrator interactions, through automated system configurations, or otherwise. For example, a high contrast (HC) theme or a telemetry mode may be activated. The HC theme may be one of several HC themes associated with an accessibility mode that improves visibility for vision-impaired users of a graphical user interface and associated UI elements provided by a computing device. The HC theme may be associated with global color settings maintained by the computing device. In aspects, a theme may consist of a set of color settings used for various aspects and states of graphical user interface objects such as, but not limited to, foreground, background, pointer-over foreground, pointer-over background, selected foreground, selected background, disabled foreground and disabled background. For instance, when an HC theme is selected, HC colors associated with the selected HC theme may be applied to render aspects (e.g., foreground, background, font, outline, etc.) of the UI Element in each state of the UI element (e.g. active, selected, pointer-over, disabled, etc.) The HC theme may consist of global color settings that are appropriate for rendering UI elements to improve visibility for vision-impaired users. In aspects, the global settings including the global color settings may be stored by the computing system. Alternatively, the telemetry mode may indicate whether telemetry settings should be activated or not. In aspects, when the telemetry mode is active (e.g., ON), user interaction data associated with the at least one UI element may be collected and transmitted to a remote server for further analysis. In contrast, when the telemetry mode is inactive (e.g., OFF), user interaction data associated with the at least one UI element may not be collected or transmitted. In aspects, the global settings including the telemetry settings may be stored by the computing system.

At determine operation 106, the indication to change the system-level settings may be evaluated to determine which system-level settings to implement. If the system-level settings have been changed to activate an HC theme, the method may progress to retrieve operation 108. If the system-level settings have been changed to activate a telemetry mode, the method may progress to FIG. 1B at transition "A."

At retrieve operation 108, when the HC theme is activated (e.g., ON), global color settings may be retrieved for the HC theme. For instance, the global color settings may be coded in a base portion of the encoding for the at least one UI element or may be referenced in the encoding of the at least one UI element and retrieved from memory associated with an operating system of the computing device. The global color settings may specify high contrast colors for one or more aspects and states of the at least one UI element, such as but not limited to foreground, background, pointer-over foreground, pointer-over background, selected foreground, selected background, disabled foreground, disabled background, and the like.

At override operation 110, the custom color settings encoded for the at least one UI element may be overridden by the global color settings. That is, in aspects, the global color settings associated with the HC theme may be used to render the at least one UI element instead of the custom color settings encoded for the at least one UI element. For example, an encoding of the at least one element may include a "base portion" associated with the global settings and a "custom portion" associated with the custom settings. In one instance, the base portion may include encoded color settings for one or more aspects and states of the at least one UI element, a reference to color settings in memory associated with an operating system of the computing device, or a combination thereof. In aspects, when various system-level settings are activated (e.g., HC theme and/or telemetry mode), the base portion of the encoding may override the custom portion of the encoding.

At display operation 112, the at least one UI element may be displayed by the graphical user interface using the global color settings associated with the HC theme. In this way, automatically updating the rendering of the at least one UI element in compliance with the HC theme may be processed without requiring a developer to encode custom color settings compliant with the HC theme. Rather, the base portion of the encoding, which references global color settings compliant with the HC theme, may automatically override the custom portion of the encoding when the HC theme is activated.

With reference to FIG. 1B, when the telemetry mode is activated (e.g., ON), the method may progress to retrieve operation 114 from transition "A." At retrieve operation 114, telemetry settings may be retrieved from the global settings associated with the computing device. For instance, the telemetry settings may be referenced in the encoding of the at least one UI element and retrieved for an application executing on the computing device, an application accessed via a browser by the computing device, an operating system of the computing device, etc. In aspects, the telemetry settings may include, for instance, types of user interactions to record, one or more addresses for remote servers, IDs associated with the computing device, IDs associated with one or more applications, and the like.

At apply operation 116, the telemetry settings may be applied to the at least one UI element. As described above, an encoding of the at least one element may include a "base portion" associated with the global settings and a "custom portion" associated with custom settings. In aspects, when the telemetry mode is activated, references to telemetry settings, provided in the base portion of the encoding, provided as a reference to memory associated with an operating system of the computing device, or a combination thereof, may be activated. Such references may be followed to retrieve and apply the telemetry settings to the at least one UI element.

At collect operation 118, event information from the at least one UI element of the graphical user interface may be collected. In aspects, the event information may include events arising from user interactions with the at least one UI element, e.g., button push, selection of list item, enable and disable, pointer-over, mouse click, scroll, etc. The event information may further include a name of the UI element (e.g., to identify which UI element on which XAML page, etc.), a unique identifier for the UI element (e.g., if a UI element is used in several places, the unique identifier specifies a particular UI element), a timestamp, general meeting information, etc. Based on such user interactions, information regarding events such as a number of scheduled meetings are joined by a user, a number of public switched telephone network (PSTN) calls, a number of peer-to-peer (P2P) calls, events regarding searching a participant, events regarding presenting a PowerPoint content, events regarding projecting a local laptop to the meeting.

At report operation 120, the event information may be sent to a telemetry server according to the telemetry settings applied to the at least one UI element. In aspects, the telemetry server may be located at a remote location, where user interactive events for particular applications and graphical user interface objects may be sent for analysis. In other aspects, the telemetry server may be a part of or associated with the computing device. For example, the event information may be analyzed to assess whether use of particular applications or graphical user interface objects are within a reasonable range of expectations based on predicted use scenarios. In another example, the event information may be analyzed to determine whether user interactions with the particular applications or graphical user interface are experiencing errors.

As discussed above, designers of application software may remotely collect information about incidents such as errors and warnings from executing application programs on computer systems and devices in order to validate use cases and address issues. For example, a telemetry application may collect and report application-specific user interactive events to a central server. The collected information may then be analyzed by the central server to detect anomalies and issues associated with the application. Such analysis may be used to determine whether use case scenarios associated with the application are valid and successful. For example, receiving repeated events on a "next slide" button during a presentation may be indicative of a failure in advancing slides during a presentation, despite the intended use case associated with providing reliable presentation features by the application program.

For example, while not shown in the figures, the telemetry server may store reported event information for analysis. An interval of button press events for a "Next Slide" button provided by a slide presentation application may be remotely analyzed using telemetry. If the frequency is greater than a predefined threshold value, then the situation may be diagnosed as a presenter having an issue transitioning to next slides, and the application helpdesk may be dispatched to contact the presentation application user via the network. In aspects, event information may be collected and sent to remote telemetry servers as a part of telemetry feature associated with the base portion of the encoding for the at least one UI element, without requiring application developers to design and develop custom code to perform such actions.

As should be appreciated, operations 102-120 are described for purposes of illustrating the present methods and systems and are not intended to limit the disclosure to a particular sequence of steps, e.g., steps may be performed in differing order, additional steps may be performed, and disclosed steps may be excluded without departing from the present disclosure.

Figure 2A:
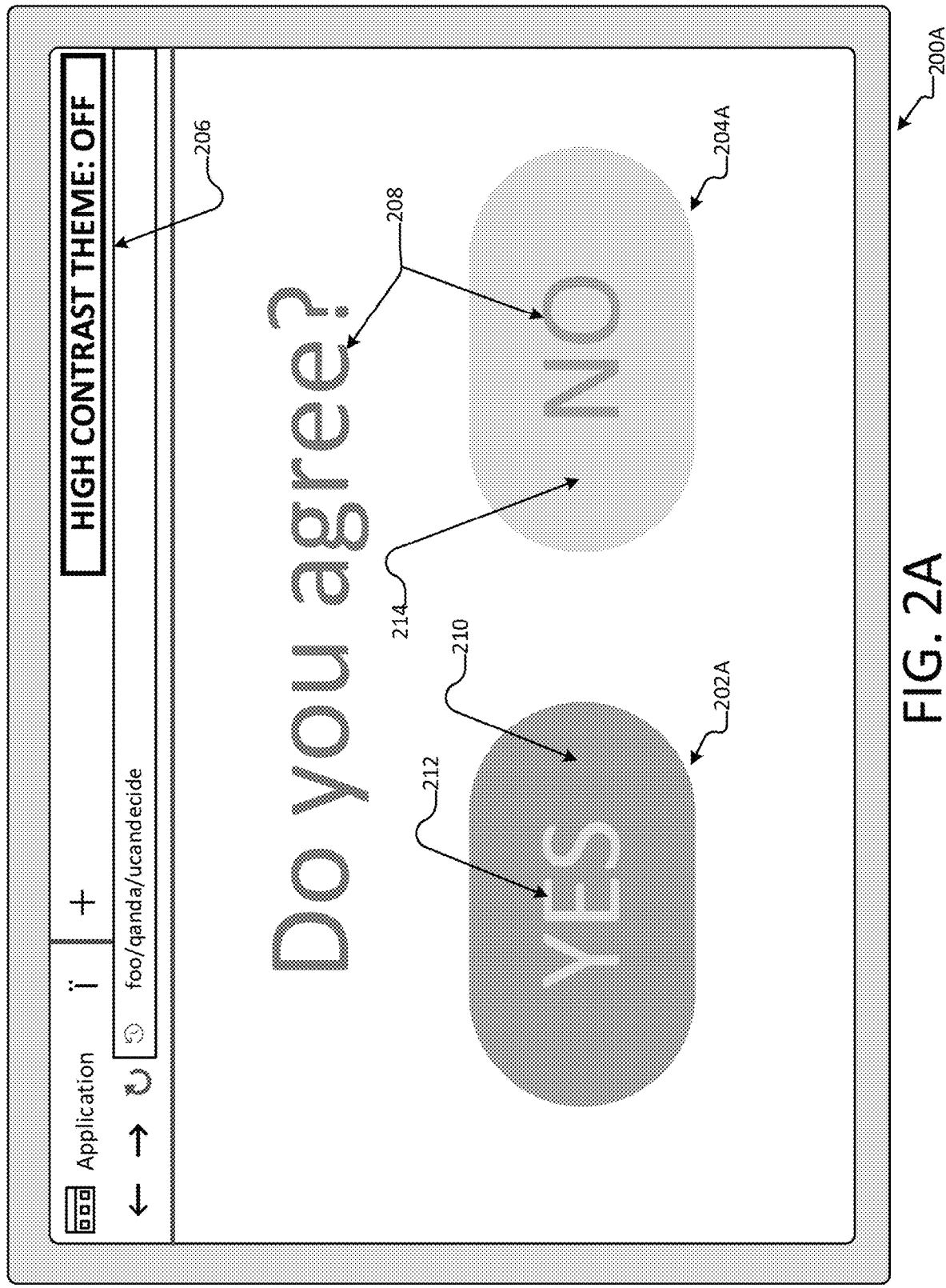
FIG. 2A depicts a graphical user interface displaying graphical UI elements as specified by an application with a high contrast (HC) theme OFF, according to an example.

FIG. 2A illustrates an example of a graphical user interface 200A providing one or more UI elements associated with an application when the HC theme is OFF, as provided by prompt 206. In aspects, custom color settings as specified in a custom portion of an encoding for the one or more UI elements may be used to render custom colors when the HC theme is OFF. In this case, the text of a question "Do you agree?" may be displayed in a dark gray font (e.g., first custom font color 208). Additionally, a "YES" button 202A may have a dark gray background (e.g., first custom background color 210) with the "Yes" text displayed in a light gray font (e.g., second custom font color 212); and a "NO" button 204A may have a light gray background (e.g., second custom background color 214) with the "No" text displayed in the dark gray font (e.g., the first custom font color 208). In aspects, application UI designers may specify custom colors, such as light gray and dark gray, for various text, buttons, banners, or other UI elements within a graphical user interface. This way, designers are able to customize contents presented within graphical user interfaces with esthetic color schemes that improve the overall user experience with the user interface. In aspects, however, such custom color schemes may be unrecognizable to users who are visually impaired and require high contrast colors to distinguish among UI elements within a graphical user interface.

Figure 2B:
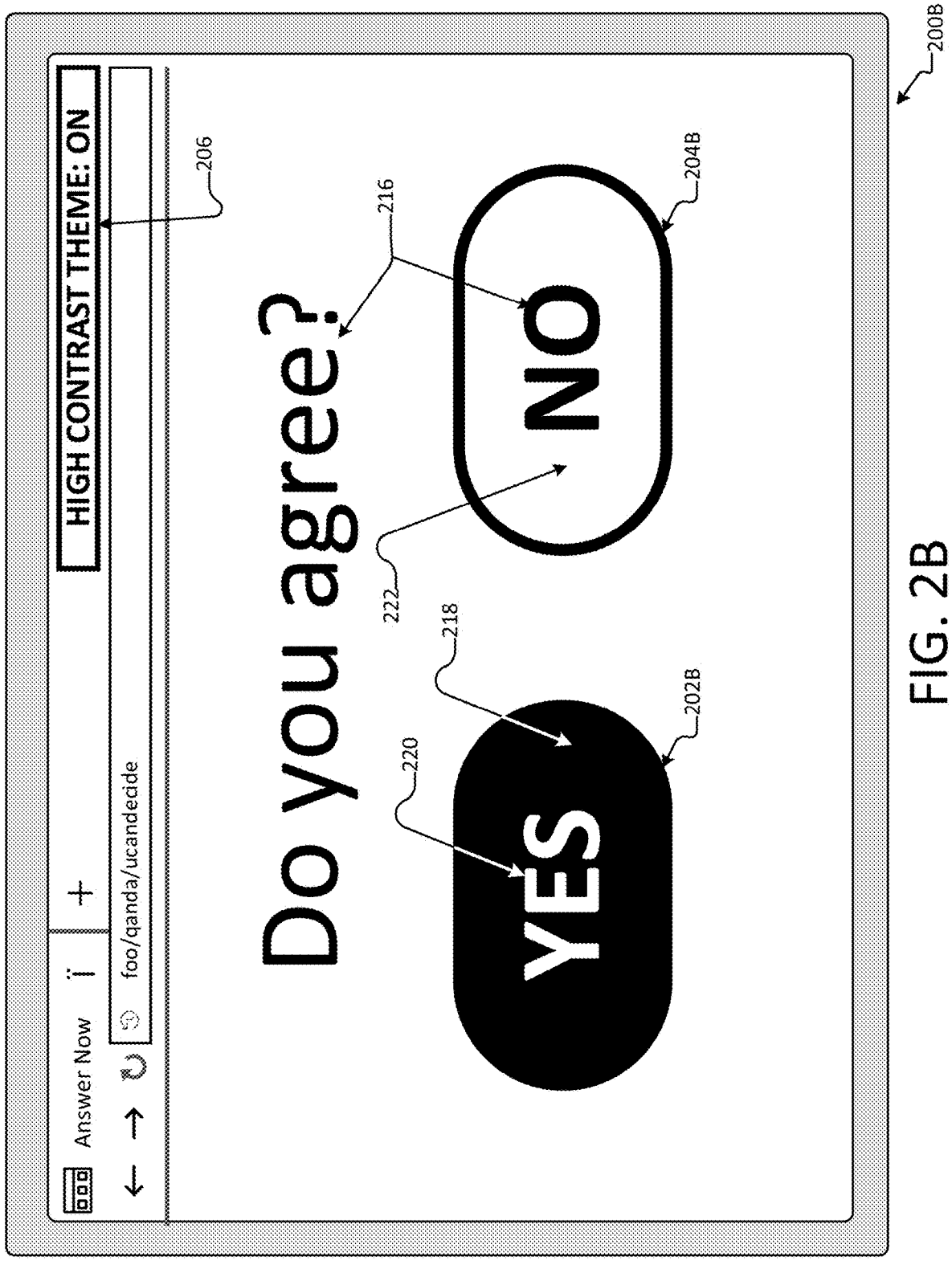
FIG. 2B depicts a graphical user interface displaying graphical UI elements as specified by an application with a high contrast (HC) theme ON, according to an example.

FIG. 2B illustrates an example of a graphical user interface 200B providing one or more UI elements associated with an application when the HC theme is ON, as provided by prompt 206. In aspects, HC color settings as specified in a base portion of an encoding for the one or more UI elements may be used to render HC colors when the HC theme is ON. In this case, the text of a question "Do you agree?" may be displayed in a black font (e.g., first HC font color 216). Additionally, Yes Button 202B may have a black background (e.g., first HC background color 218) with the "Yes" text displayed in a white font (e.g., second HC font color 220), and No Button 204B may have a white background (e.g., second HC background color 222) with the "No" text displayed in the black font (e.g., the first HC font color 216). In aspects, rendering of UI elements within graphical user interfaces based on high contrast colors may be improved by processing a base portion of the encoding for the UI elements, without requiring application developers to design and develop custom code for the HC colors. In aspects, graphical user interface elements may include buttons, lists, ribbons, banners, menus, or other types of graphical user interface objects. For example, the HC theme may be enforced on a menu where each menu item may be rendered in high contrast color as pre-specified by the global color settings referenced or encoded in a base portion of an encoding for the menu.

As should be appreciated, the various methods, devices, components, etc., described with respect to FIGS. 2A and 2B are not intended to limit the systems and methods to the particular components described. Accordingly, additional topology configurations may be used to practice the methods and systems herein and/or some components described may be excluded without departing from the methods and systems disclosed herein.

Figure 3A:
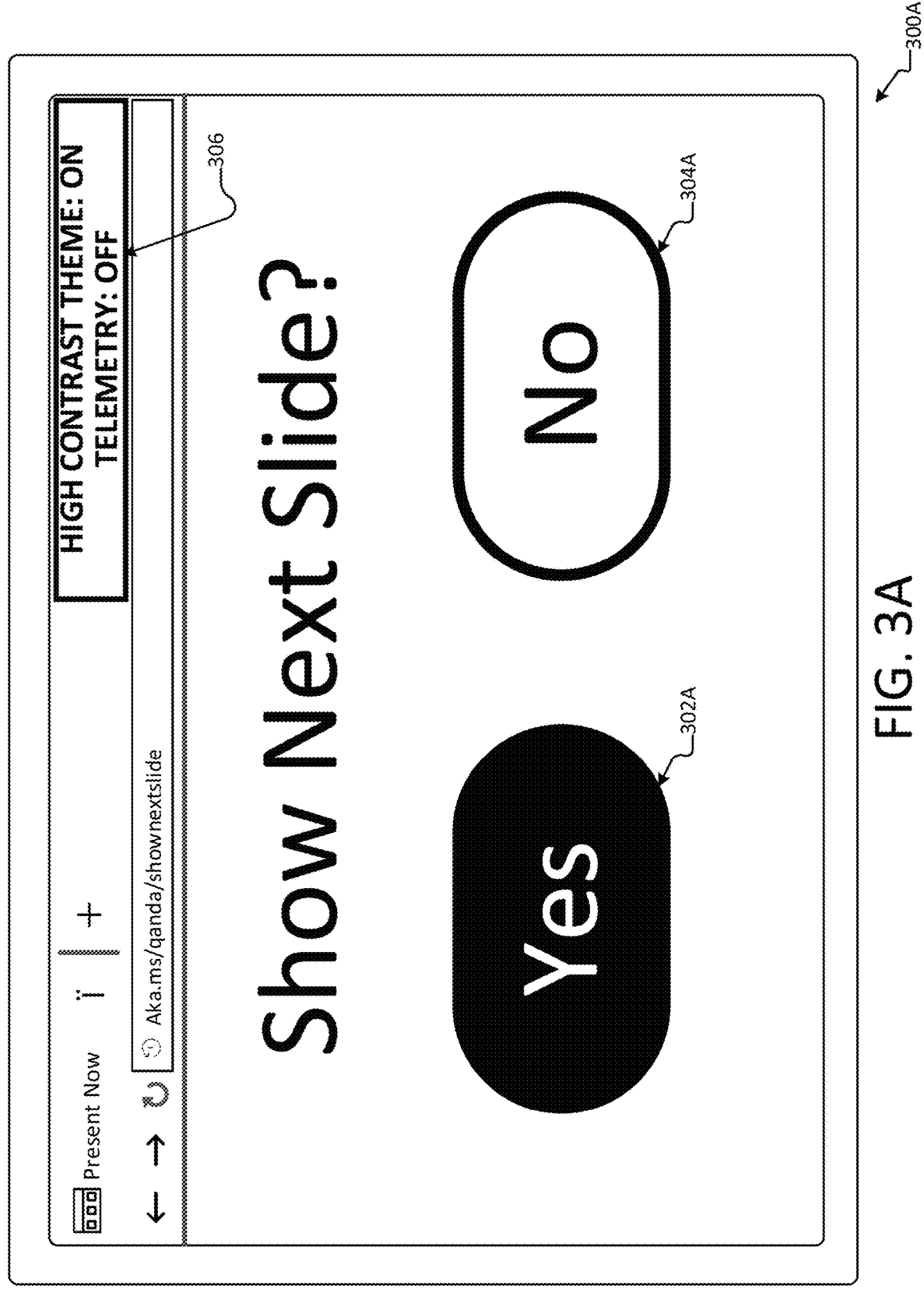
FIG. 3A depicts a graphical user interface displaying graphical UI elements with a telemetry setting OFF, according to an example.

FIG. 3A illustrates a graphical user interface 300A of a dialog window as displayed by a presentation application when the HC theme is ON and telemetry mode is OFF, as specified by prompt 306. In this case, as detailed above, HC color settings as specified in a base portion of the encoding for the one or more UI elements may be used to render HC colors when the HC theme is ON. Further, in the illustrated example, a presenter of slides associated with the presentation application may be asked to decide whether to show the next slide, and there may be two buttons displayed: a Yes Button 302A and a No Button 304A. The presenter may select the Yes Button 302A to advance to the next slide, and may select the No Button 304A so as not to advance to the next slide. In aspects, this graphical user interface dialog may be displayed during the presentation, to assist the presenter in advancing to the next slide as the presentation proceeds. In further aspects, when the telemetry mode is OFF, event information is neither collected based on user interactions with the Yes Button 302A or the No Button 304A, nor is event information reported to a remote telemetry server.

Figure 3B:
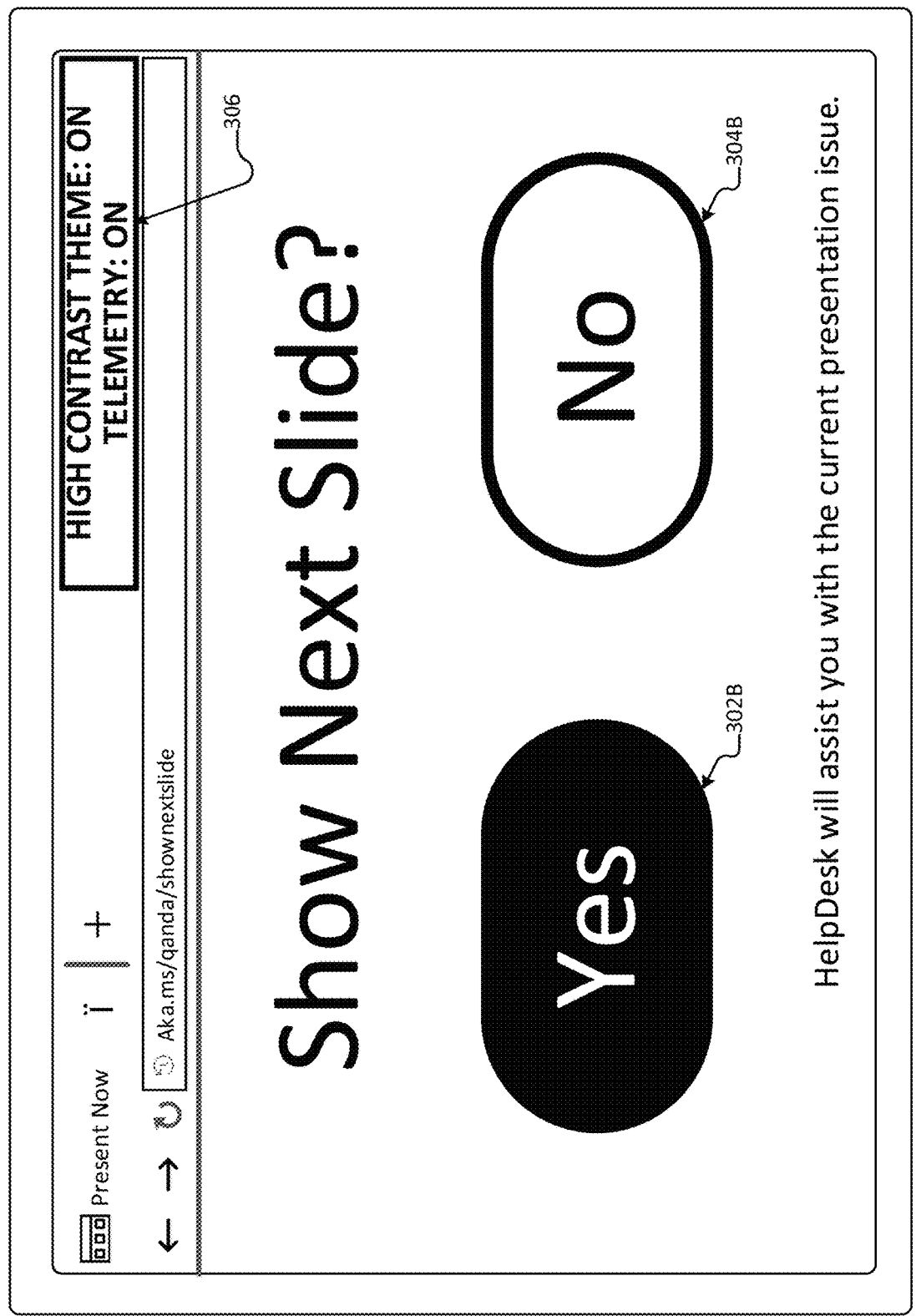
FIG. 3B depicts a graphical user interface displaying graphical UI elements with a telemetry setting ON, according to an example.

FIG. 3B illustrates a graphical user interface 300B of a dialog window as displayed in a presentation application when the HC theme is ON and telemetry mode is ON, as specified by prompt 306. In this case, as detailed above, HC color settings as specified in a base portion of the encoding for the one or more UI elements may be used to render HC colors when the HC theme is ON. Further, in the illustrated example, a presenter of slides associated with the presentation application may be asked to decide whether to show the next slide, and there may be two buttons displayed: a Yes Button 302B and a No Button 304B. The presenter may select the Yes Button 302B to advance to the next slide, and may select the No Button 304B so as not to advance to the next slide. In aspects, this graphical user interface dialog may be displayed during the presentation, to assist the presenter in advancing to the next slide as the presentation proceeds. For instance, in this case, the presenter may be having an issue advancing to the next slide, and may select the Yes Button 302B repeatedly. As the telemetry setting is ON, event information associated with the repeated user interactions with the Yes Button 302B may be transmitted to a telemetry server for further analysis. According to the example embodiment, when the telemetry server detects that the presenter has selected the Yes Button 302B at a frequency greater than a predefined threshold value, a message "HelpDesk will assist you with the current presentation issue" may be displayed in the graphical user interface dialog of the presentation application.

As should be appreciated, the various methods, devices, components, etc., described with respect to FIGS. 3A and 3B are not intended to limit the systems and methods to the particular components described. Accordingly, additional topology configurations may be used to practice the methods and systems herein and/or some components described may be excluded without departing from the methods and systems disclosed herein.

Figure 4A:
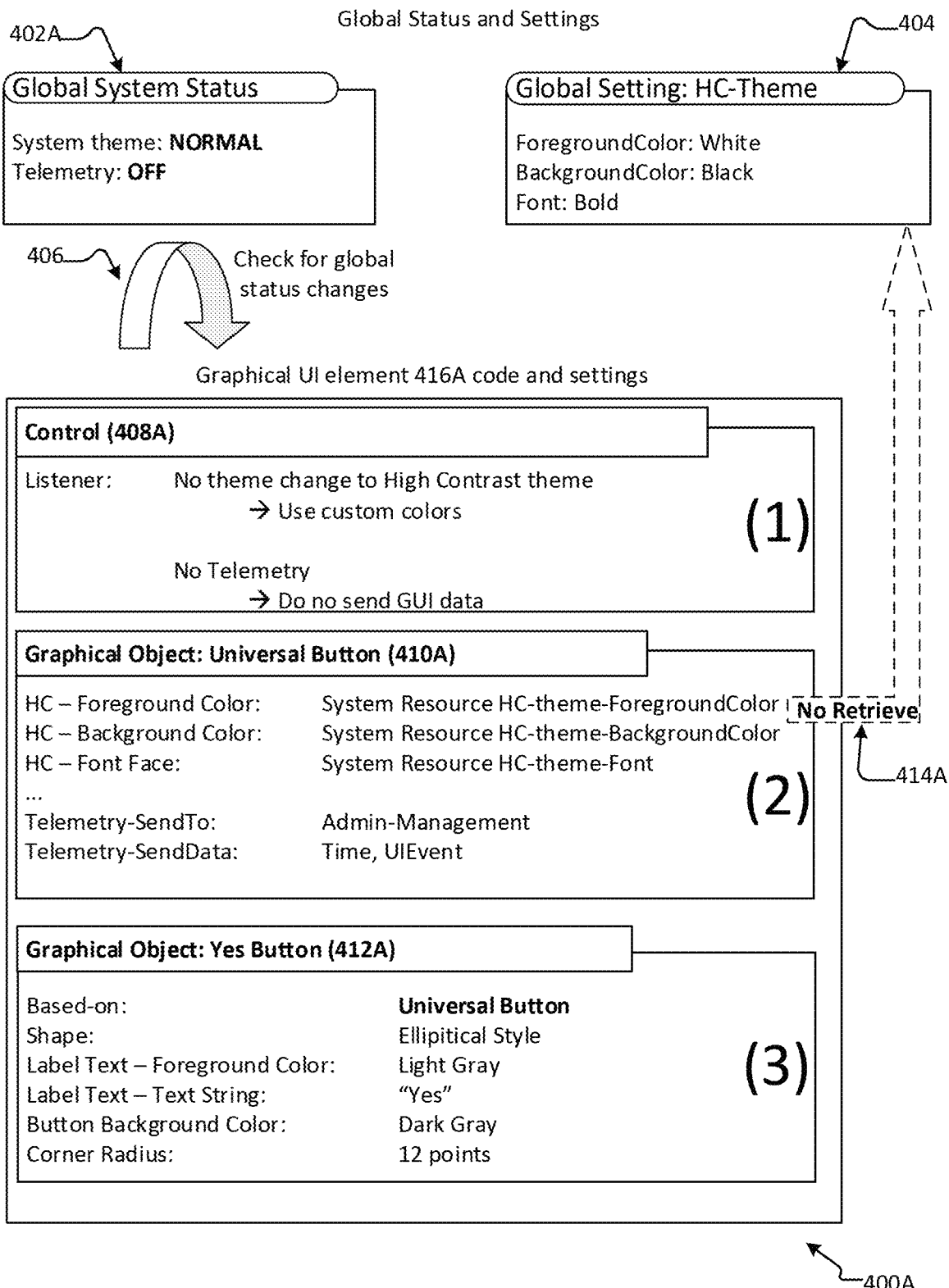
FIG. 4A illustrates a schematic sample of a graphical object encoded using a universal button with a high contrast (HC) theme and a telemetry setting OFF, according to examples.

FIG. 4A illustrates a schematic diagram 400A of a graphical user interface object with a Global System Status 402A set to a normal color theme and a telemetry mode OFF. In particular, the schematic diagram 400A is associated with a UI element 416A. In aspects, the application program may instantiate the UI element 416A, e.g., as Yes Button 202A of FIG. 2A, that is encoded with three sections of code.

As shown in section (3), custom styles for the UI element 416A, e.g., rendered as Yes Button 202A, may be defined as custom settings for coded Yes Button 412A. For example, a font color of label text, "Yes," may be set to light gray while a background color may be set to dark gray. Corner radius parameters for coded Yes Button 412A may be set at 12 points to set the shape of the button to be elliptical style. In aspects, the custom styles for coded Yes Button 412A may be designed by application UI designers and may inherit encodings of a base button object (e.g., Universal Button 410A) and a Control 408A. For example, the UI designers may specify custom colors, texts and shapes for the UI element 416A by using a mark-up language such as XAML (Extensible Application Markup Language). In some cases, the custom styles for coded Yes Button 412A may be developed by UI designers, whereas the coding for the Universal Button 410A and the Control 408A may be developed by base object programmers. In other cases, each section of code for the UI element 416A may be developed by one entity or collaborative entities.

With reference to the second section (2), the Universal Button 410A may be defined and coded by a base object programmer, e.g., using languages such as XAML and C#. In aspects, the Universal Button 410A may include base code referencing system resources to retrieve global color settings, e.g., high contrast (HC) color settings, for rendering the UI element under certain system conditions, e.g., when the HC theme has been selected. Additionally or alternatively, the Universal Button 410A may be coded with telemetry settings specifying one or more types of event information, a collection cycle or frequency, telemetry server address, etc. In aspects, when programming coded Yes Button 412A, the code for Universal Button 410A may be inheritable such that custom settings for HC colors and/or telemetry need not be programmed for coded Yes Button 412A. However, in general, when Global System Status 402A is configured with a system theme of "Normal" (e.g., default theme) and telemetry set to "OFF," the custom code of section (3) for coded Yes Button 412A overrides the base code of section (2) for Universal Button 410A. That is, under the above conditions, a custom color scheme for coded Yes Button 412A, as specified by custom code section (3), is applied when rendering the UI element (e.g., rendered Yes Button 202A) in the graphical user interface 200A and global color settings (e.g., HC color settings) will not be retrieved 414A from Global Setting resource 404. For instance, as illustrated by rendered Yes Button 202A of FIG. 2A, a light gray custom color may be used as a foreground color (e.g., font color) for text label "yes," while a dark gray custom color may be used for background color. Additionally, event information for the UI element 416A (e.g., rendered Yes Button 202A) will not be collected or reported.

With reference to the first section (1), Control 408A may be written in C# language or other language to define conditions when global settings may override custom settings. For instance, the application programmers may specify logic or conditions for rendering final button objects such as the rendered Yes Button 202A and Yes Button 202B. In addition, the logic may be defined for other UI elements within the graphical user interface, such as the No Button 204A and No Button 204B. In aspects, Control 408A may be programmed to periodically check for changes 406 in Global System Status 402A. In the illustrated aspect, Control 408A detected no theme change and no telemetry status change. Accordingly, custom color settings may be used for rendering colors for the UI element 416A (e.g., rendered Yes Button 202A) because the Global System Status 402A indicates the system theme is "Normal" (e.g., the HC theme is not selected). Additionally, event information for the UI element 416A (e.g., rendered Yes Button 202A) will not be collected or reported.

Figure 4B:
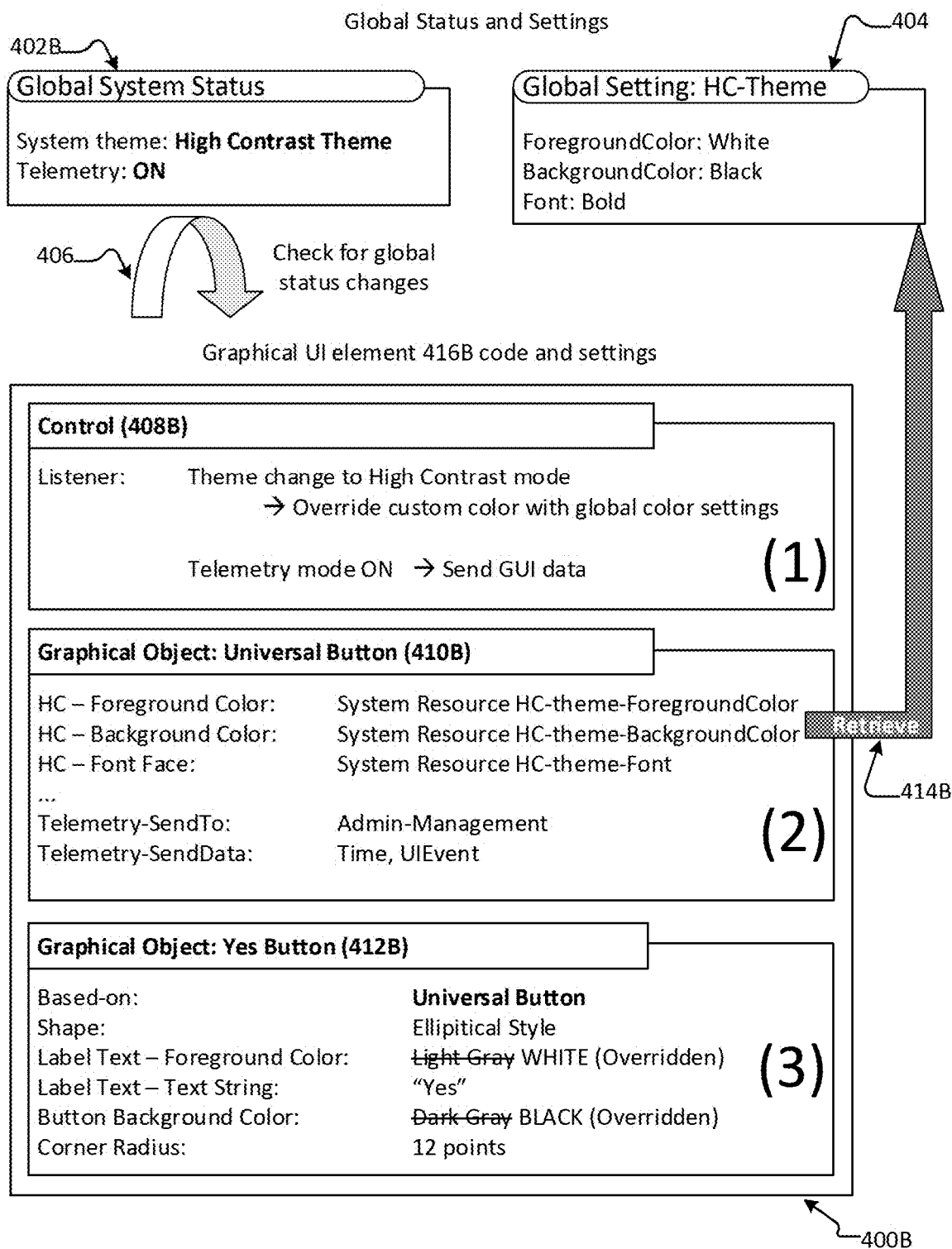
FIG. 4B illustrates a schematic sample of a graphical UI object encoded using a universal button with a high contrast (HC) theme and a telemetry setting ON, according to examples.

FIG. 4B illustrates a schematic diagram 400B of a graphical user interface object with a Global System Status 402B set to a HC theme with a telemetry mode ON. In particular, the schematic diagram 400B is associated with a UI element 416B. In aspects, the application program may instantiate the UI element 416B, e.g., rendered Yes Button 302B of FIG. 3B, that is encoded with three sections of code. As should be appreciated, the coding for UI element 416B is the same as the coding for UI element 416A; however, in this case, the global status changes 406 have been made resulting in Global System Status 402B.

As illustrated by FIG. 4B, with reference to the first section (1), Control 408B may be written in C# language or other language to define conditions when global settings may override custom settings. As detailed above, Control 408B may be programmed to periodically check for changes 406 in Global System Status 402B. In the illustrated aspect, Control 408B detected a theme change to HC theme and a telemetry status of ON. Accordingly, custom color settings coded in section (3) (e.g., coding for Yes Button 412B) may be overridden by global color settings referenced in second section (2) (e.g., coding for Universal Button 410B) for UI element 416B. That is, in aspects, as Global System Status 402B is set to HC theme, global color settings retrieved 414B from Global Settings resource 404 may be used to render the UI element 416B (e.g., as rendered Yes Button 302B). For instance, as illustrated by rendered Yes Button 302B of FIG. 3B, a white HC color may be used as a foreground color (e.g., font color) for text label "yes" (overriding custom color light gray), while a black HC color may be used for background color (overriding custom color dark gray). Additionally, based on Global Settings resource 404, the font for text label "yes" may be set to "bold." In aspects, other settings specified by code section (3) (e.g., coding for Yes Button 412B) may be maintained with the HC theme, e.g., shape, text label, corner radius, etc. Alternatively, code for Universal Button 410B may specify global color settings for one or more aspects and states of the Universal Button 410B. In this case, global color settings as coded in the Universal Button 410B may be applied to render the UI element 416B (e.g., as rendered Yes Button 302B) in lieu of retrieving 414B global color settings from the Global Setting resource 404.

Additionally, as Global System Status 402B is set to telemetry ON, event information for the UI element 416B (e.g., rendered Yes Button 302B) may be collected and reported. In this case, global settings specified by coded Universal Button 410B may provide telemetry settings such as an address for sending event information (e.g., Admin-Management), a frequency for sending event information (e.g., Time), one or more types of event information (e.g., UIEvent), etc. In aspects, telemetry settings may be stored in Global Settings resource 404. In this case, during the telemetry mode ON, the telemetry settings may be retrieved 414B from the Global Settings resource 404 based on references encoded in the Universal Button 410B. For instance, as described above, if a presenter had an issue advancing to the next slide and repeatedly selected the Yes Button 302B, event information associated with the repeated user interactions with the Yes Button 302B may be transmitted to a telemetry server for further analysis. In some cases, when the telemetry server detects that the presenter has selected the Yes Button 302B at a frequency greater than a predefined threshold value, a message "HelpDesk will assist you with the current presentation issue" may be displayed in the graphical user interface dialog of the presentation application.

In aspects, the coding for the UI elements 416A and 416B provide benefits over previous programming methods. That is, in order to provide custom graphical UI elements for a graphical user interface, UI designers and developers were required to specify telemetry settings and HC colors within a custom code section (e.g., corresponding to custom code section (3)) for each UI element. Rather than benefiting from an inheritable base code section that defined uniform HC colors and telemetry settings at a system level (e.g., corresponding to base code section (2)), programmers were required to define and customize such settings independently for each UI element. Such programming requirements are burdensome to programmers by increasing development time (e.g., required for testing customized HC colors) and by increasing total code length (e.g., resulting from increased custom code for each UI element), thereby increasing coding and debugging time as well as processing time and resources.

As should be appreciated, the various methods, devices, components, etc., described with respect to FIGS. 4A and 4B are not intended to limit the systems and methods to the particular components described. Accordingly, additional topology configurations may be used to practice the methods and systems herein and/or some components described may be excluded without departing from the methods and systems disclosed herein.

FIG. 5 depicts schematic code samples for a graphical UI element encoded using universal button code, according to an example. As illustrated, sample code 500 for a UI element includes three sections of code. For example, a first section 502 (e.g., Mybutton.xaml.cs) may be written in C# language or other programming language. The first section 502 may contain logic for listening for system UI theme changes. If a system UI change event indicates a theme change to a HC theme (e.g. a value of accessibilitySettings.HighContrast is TRUE), then a value of a variable Background may be set to be a resource data container "MyButtonHighContrastBackgroundBrush."

As further illustrated, a second section 504 (e.g., MyButton.xaml) may contain references to a system resource as a part of a button object, e.g., written in XAML language. In aspects, the system resource for a theme, called "SystemColorWindowColor," may be referenced by the code and set in a variable "MyButtonHighContrastBackgroundBrush." In aspects, global color settings for a HC theme may be referenced and applied to the button object when a theme is changed to the HC theme.

As still further illustrated, a third section 506 (e.g., MyButtonStyle.xaml) may contain custom code for various customized styles, such as custom colors and shapes for the MyButton graphical object. In aspects, the third section 506 may be designed, developed and coded by one or more application UI designers, whereas the other two sections 502, 504 may be developed and coded by the base object programmers for an application. In other aspects, each section of the sample code 500 for a button object may be coded by the same developer, designer and/or programmer. As should be appreciated, one or more sections of sample code 500 for a button object may be generated by any suitable design, development and/or programming team or individual.

In aspects, flexibility and efficiency in customizing graphical renderings of UI elements may be improved for UI designers by using a base code section for programming HC colors and telemetry settings while using a custom code section for providing rich and robust custom color schemes, shapes, textures, etc. In this case, global settings coded in the base code section override custom settings only when system-level changes are detected (e.g., a change to HC theme ON and/or telemetry mode ON). In this way, the burdens on programmers is reduced by decreasing development time (e.g., based on pre-tested, HC compliant, system-compatible HC colors) and by decreasing total code length (e.g., by inheriting base code for each UI element), thereby decreasing coding and debugging time as well as processing time and resources.

As should be appreciated, the various methods, devices, components, etc., described with respect to FIG. 5 are not intended to limit the systems and methods to the particular components described. Accordingly, additional topology configurations may be used to practice the methods and systems herein and/or some components described may be excluded without departing from the methods and systems disclosed herein.

FIGS. 6A-9 and the associated descriptions provide a discussion of a variety of operating environments in which aspects of the disclosure may be practiced. However, the devices and systems illustrated and discussed with respect to FIGS. 6A-9 are for purposes of example and illustration and are not limiting of a vast number of computing device configurations that may be utilized for practicing aspects of the disclosure, described herein.

Figure 6A:
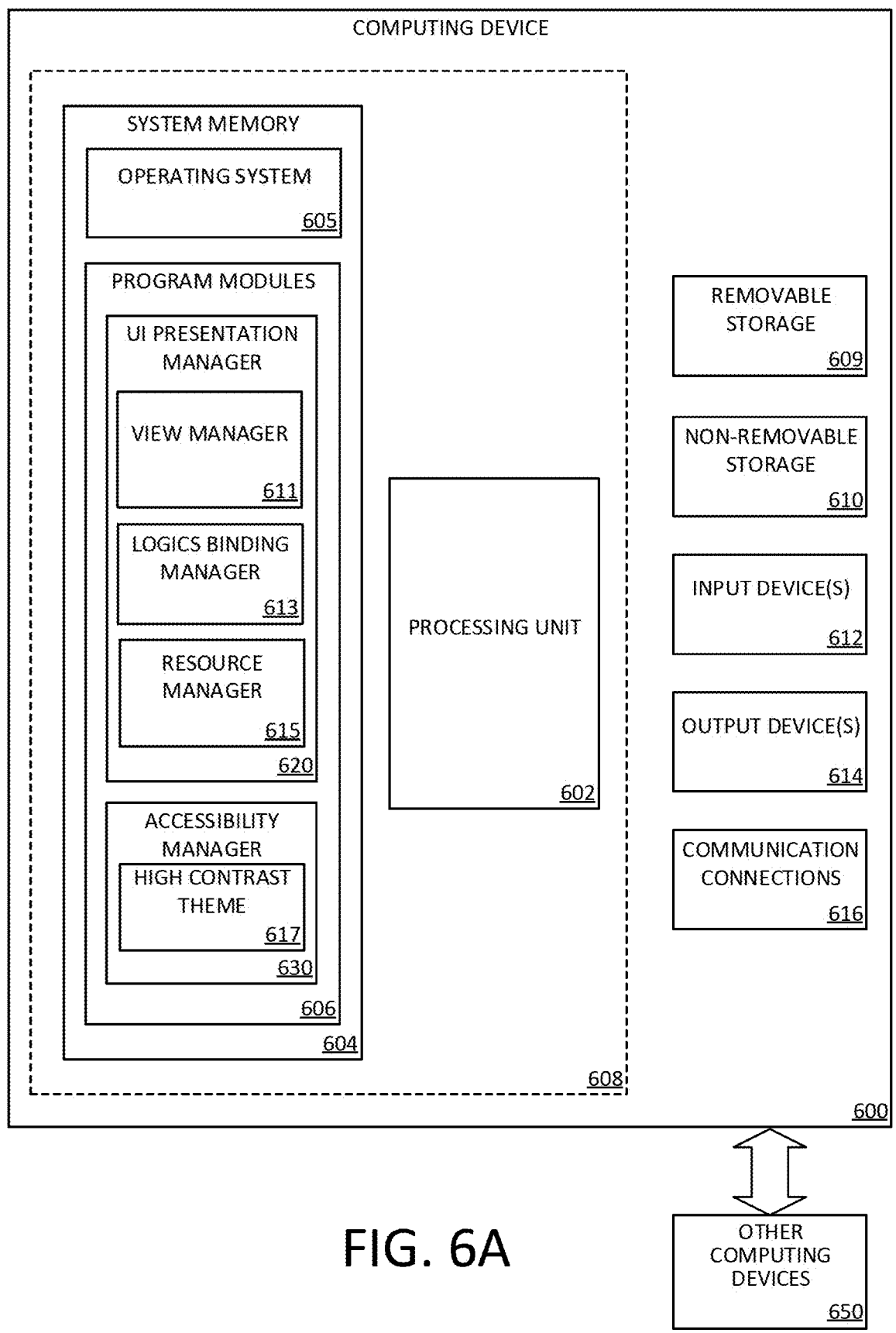
FIGS. 6A and 6B are block diagrams illustrating example physical components of a computing device with which aspects of the disclosure may be practiced.
Figure 6B:
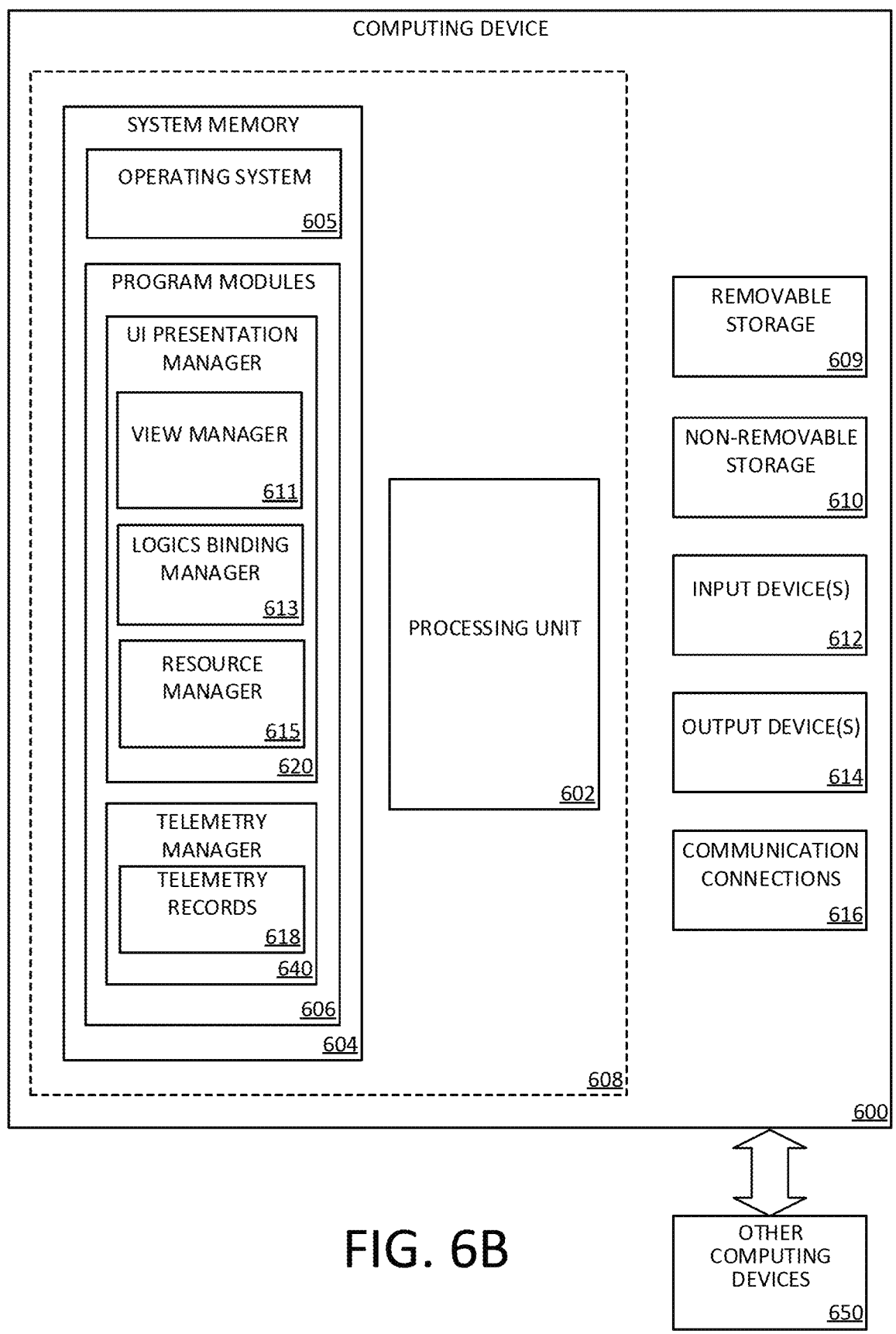

FIGS. 6A and 6B are block diagrams illustrating physical components (e.g., hardware) of a computing device 600 with which aspects of the disclosure may be practiced. The computing device components described below may have computer executable instructions for implementing a UI Presentation Manager 620 on a computing device, including computer executable instructions for UI Presentation Manager 620 that can be executed to implement the methods disclosed herein. In a basic configuration, the computing device 600 may include at least one processing unit 602 and a system memory 604. Depending on the configuration and type of computing device, the system memory 604 may comprise, but is not limited to, volatile storage (e.g., random access memory), non-volatile storage (e.g., read-only memory), flash memory, or any combination of such memories. The system memory 604 may include an operating system 605 and one or more program modules 606 suitable for performing the various aspects disclosed herein. For example, the one or more program modules 606 may include a User Interface (UI) Presentation Manager 620 for managing display of one or more graphical user interface objects and user interactions.

As illustrated by FIG. 6A, UI Presentation Manager 620 may include one or more components, including a View Manager 611 (e.g., for managing how graphical user interface objects are defined, customized, and rendered for specific styles, colors, and shapes), a Logics Binding Manager 613 (e.g., for managing data bindings between graphic customization and application logic and controls), and a Resource Manager 615 (e.g., for managing system resources for application programs). As illustrated by FIG. 6A, UI Presentation Manager 620 may have access to an Accessibility Manager 630 (e.g., for listening to theme changes to a high contrast theme), which may reference or be associated with a High Contrast Theme 617 accessed by Resource Manager 615. Alternatively, as illustrated by FIG. 6B, UI Presentation Manager 620 may access one or more alternative components. For example, additionally or alternatively, UI Presentation Manager 620 may access Telemetry Manager 640 for monitoring telemetry settings. Telemetry Manager 640 may reference or be associated with Telemetry Records 618 for retrieving system- or application-specific telemetry settings. In further examples, the one or more components described with reference to FIGS. 6A and 6B may be combined on a single computing device 600 or multiple computing devices 600.

The operating system 605, for example, may be suitable for controlling the operation of the computing device 600. Furthermore, embodiments of the disclosure may be practiced in conjunction with a graphics library, other operating systems, or any other application program and is not limited to any particular application or system. This basic configuration is illustrated in FIGS. 6A and 6B by those components within a dashed line 608. The computing device 600 may have additional features or functionality. For example, the computing device 600 may also include additional data storage devices (removable and/or non-removable) such as, for example, magnetic disks, optical disks, or tape. Such additional storage is illustrated in FIGS. 6A and 6B by a removable storage device 609 and a non-removable storage device 610.

As stated above, a number of program modules and data files may be stored in the system memory 604. While executing on the processing unit 602, the program modules 606 (e.g., UI Presentation Manager 620) may perform processes including, but not limited to, the aspects, as described herein. Other program modules that may be used in accordance with aspects of the present disclosure, and in particular for managing display of graphical user interface objects, may include View Manager 611, Logics Binding Manager 613, Resource Manger 615, Accessibility Manager 630, High Contrast Theme 617, Telemetry Manager 640, Telemetry Records 618, etc.

Furthermore, embodiments of the disclosure may be practiced in an electrical circuit comprising discrete electronic elements, packaged or integrated electronic chips containing logic gates, a circuit utilizing a microprocessor, or on a single chip containing electronic elements or microprocessors. For example, embodiments of the disclosure may be practiced via a system-on-a-chip (SOC) where each or many of the components illustrated in FIGS. 6A and 6B may be integrated onto a single integrated circuit. Such an SOC device may include one or more processing units, graphics units, communications units, system virtualization units and various application functionality all of which are integrated (or "burned") onto the chip substrate as a single integrated circuit. When operating via an SOC, the functionality, described herein, with respect to the capability of client to switch protocols may be operated via application-specific logic integrated with other components of the computing device 600 on the single integrated circuit (chip). Embodiments of the disclosure may also be practiced using other technologies capable of performing logical operations such as, for example, AND, OR, and NOT, including but not limited to mechanical, optical, fluidic, and quantum technologies. In addition, embodiments of the disclosure may be practiced within a general purpose computer or in any other circuits or systems.

The computing device 600 may also have one or more input device(s) 612 such as a keyboard, a mouse, a pen, a sound or voice input device, a touch or swipe input device, etc. The output device(s) 614 such as a display, speakers, a printer, etc. may also be included. The aforementioned devices are examples and others may be used. The computing device 600 may include one or more communication connections 616 allowing communications with other computing devices 650. Examples of suitable communication connections 616 include, but are not limited to, radio frequency (RF) transmitter, receiver, and/or transceiver circuitry; universal serial bus (USB), parallel, and/or serial ports.

The term computer readable media as used herein may include computer storage media. Computer storage media may include volatile and nonvolatile, removable and non-removable media implemented in any method or technology for storage of information, such as computer readable instructions, data structures, or program modules. The system memory 604, the removable storage device 609, and the non-removable storage device 610 are all computer storage media examples (e.g., memory storage). Computer storage media may include RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the computing device 600. Any such computer storage media may be part of the computing device 600. Computer storage media does not include a carrier wave or other propagated or modulated data signal.

Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

As should be appreciated, FIGS. 6A and 6B are described for purposes of illustrating the present methods and systems and are not intended to limit the disclosure to a particular sequence of steps or a particular combination of hardware or software components.

Figure 7A:
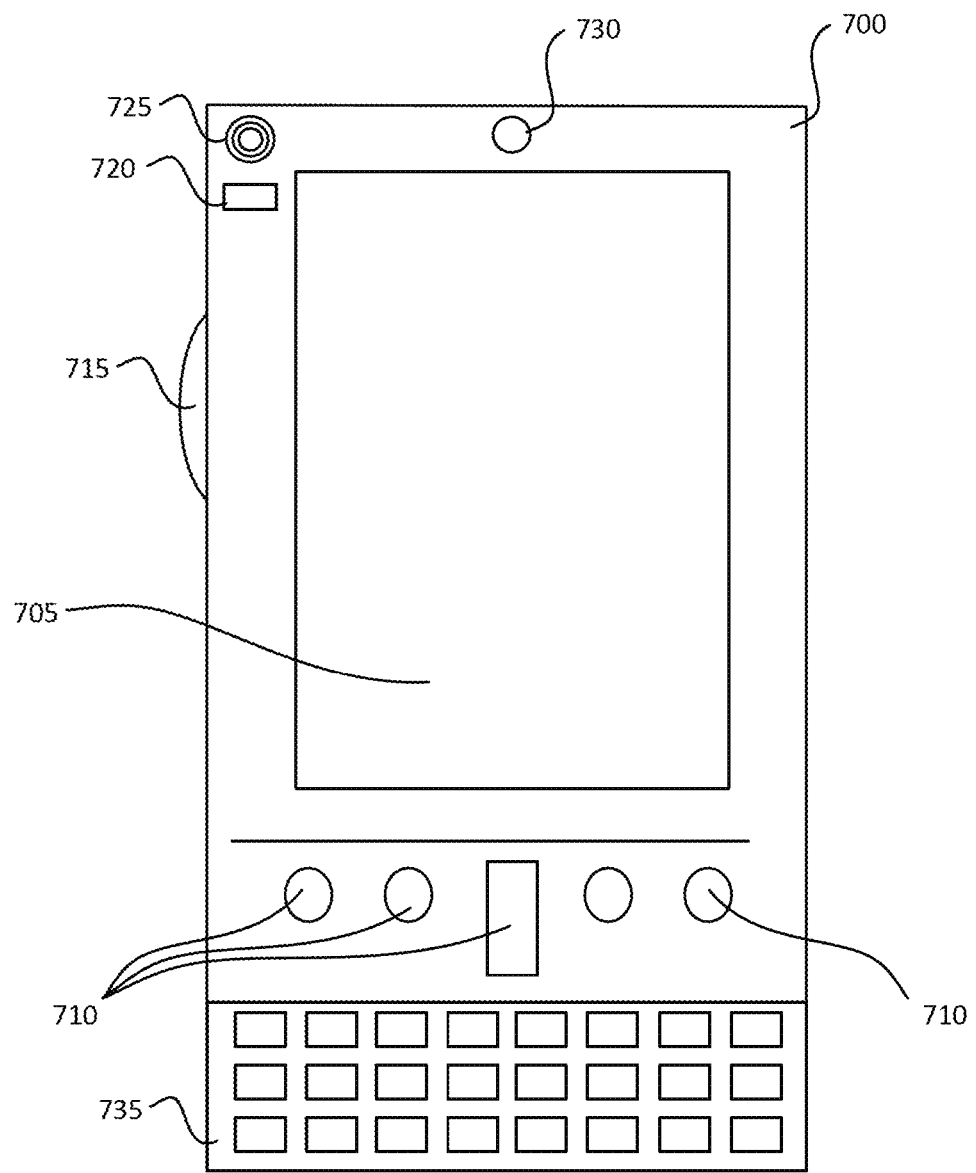
FIGS. 7A and 7B are simplified block diagrams of a mobile computing device with which aspects of the present disclosure may be practiced.
Figure 7B:
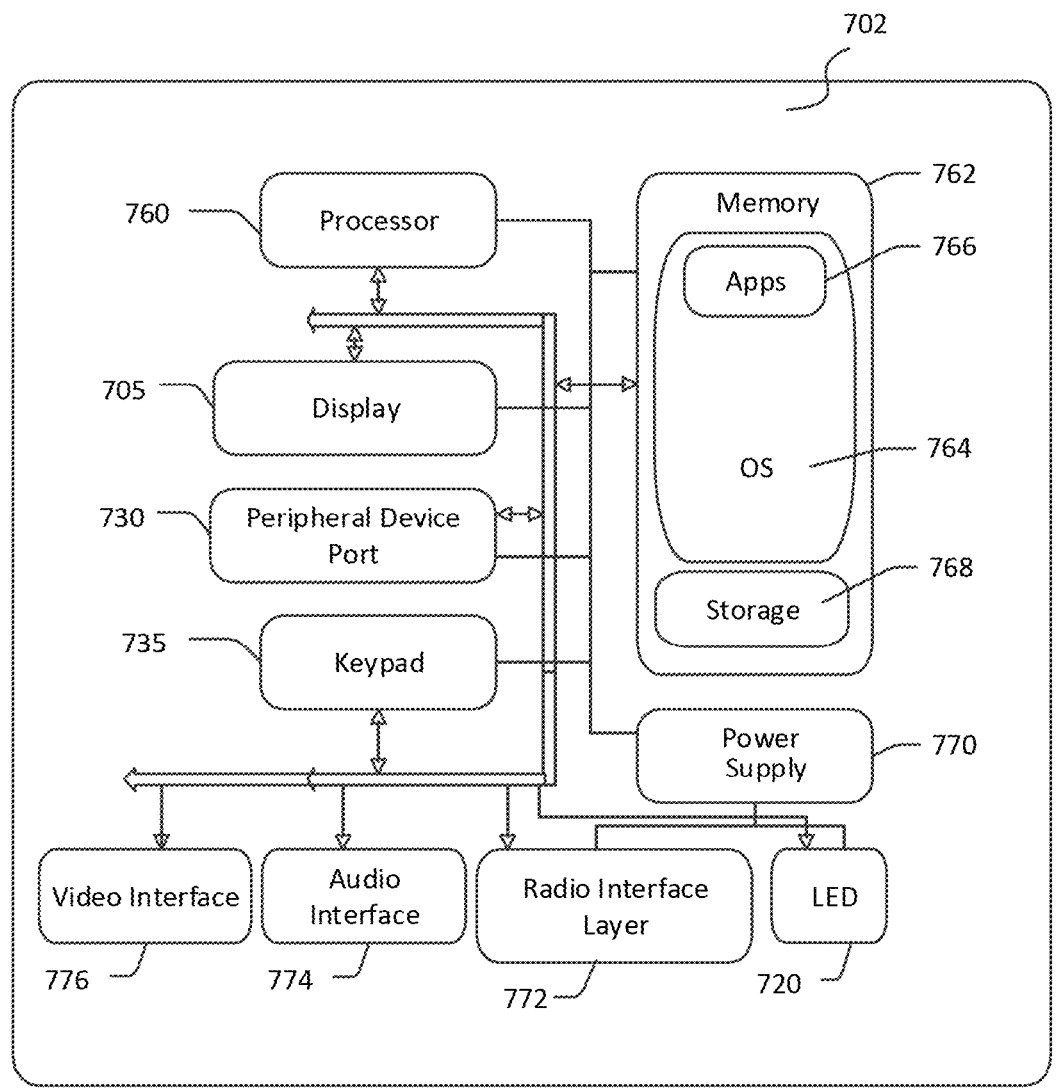

FIGS. 7A and 7B illustrate a mobile computing device 700, for example, a mobile telephone, a smart phone, wearable computer (such as a smart watch), a tablet computer, a laptop computer, and the like, with which embodiments of the disclosure may be practiced. In some aspects, the client may be a mobile computing device. With reference to FIG. 7A, one aspect of a mobile computing device 700 for implementing the aspects is illustrated. In a basic configuration, the mobile computing device 700 is a handheld computer having both input elements and output elements. The mobile computing device 700 typically includes a display 705 and one or more input buttons 710 that allow the user to enter information into the mobile computing device 700. The display 705 of the mobile computing device 700 may also function as an input device (e.g., a touch screen display). If included, an optional side input element 715 allows further user input. The side input element 715 may be a rotary switch, a button, or any other type of manual input element. In alternative aspects, mobile computing device 700 may incorporate more or less input elements. For example, the display 705 may not be a touch screen in some embodiments. In yet another alternative embodiment, the mobile computing device 700 is a portable phone system, such as a cellular phone. The mobile computing device 700 may also include an optional keypad 735. Optional keypad 735 may be a physical keypad or a "soft" keypad generated on the touch screen display. In various embodiments, the output elements include the display 705 for showing a graphical user interface (GUI), a visual indicator 720 (e.g., a light emitting diode), and/or an audio transducer 725 (e.g., a speaker). In some aspects, the mobile computing device 700 incorporates a vibration transducer for providing the user with tactile feedback. In yet another aspect, the mobile computing device 700 incorporates input and/or output ports, such as an audio input (e.g., a microphone jack), an audio output (e.g., a headphone jack), and a video output (e.g., a HDMI port) for sending signals to or receiving signals from an external device.

FIG. 7B is a block diagram illustrating the architecture of one aspect of a mobile computing device. That is, the mobile computing device 700 can incorporate a system (e.g., an architecture) 702 to implement some aspects. In one embodiment, the system 702 is implemented as a "smart phone" capable of running one or more applications (e.g., browser, e-mail, calendaring, contact managers, messaging clients, games, and media clients/players). In some aspects, the system 702 is integrated as a computing device, such as an integrated personal digital assistant (PDA) and wireless phone.

One or more application programs 766 may be loaded into the memory 762 and run on or in association with the operating system 764. Examples of the application programs include phone dialer programs, e-mail programs, personal information management (PIM) programs, word processing programs, spreadsheet programs, Internet browser programs, messaging programs, and so forth. The system 702 also includes a non-volatile storage area 768 within the memory 762. The non-volatile storage area 768 may be used to store persistent information that should not be lost if the system 702 is powered down. The application programs 766 may use and store information in the non-volatile storage area 768, such as email or other messages used by an email application, and the like. A synchronization application (not shown) also resides on the system 702 and is programmed to interact with a corresponding synchronization application resident on a host computer to keep the information stored in the non-volatile storage area 768 synchronized with corresponding information stored at the host computer. As should be appreciated, other applications may be loaded into the memory 762 and run on the mobile computing device 700, including the instructions for providing a UI Presentation Manager as described herein (e.g., View Manager, Logics Binding Manager, Resource Manager, Accessibility Manager, Telemetry Manager, etc.)

The system 702 has a power supply 770, which may be implemented as one or more batteries. The power supply 770 may further include an external power source, such as an AC adapter or a powered docking cradle that supplements or recharges the batteries.

The system 702 may also include a radio interface layer 772 that performs the function of transmitting and receiving radio frequency communications. The radio interface layer 772 facilitates wireless connectivity between the system 702 and the "outside world," via a communications carrier or service provider. Transmissions to and from the radio interface layer 772 are conducted under control of the operating system 764. In other words, communications received by the radio interface layer 772 may be disseminated to the application programs 766 via the operating system 764, and vice versa.

The visual indicator 720 may be used to provide visual notifications, and/or an audio interface 774 may be used for producing audible notifications via an audio transducer 725 (e.g., audio transducer 725 illustrated in FIG. 7A). In the illustrated embodiment, the visual indicator 720 is a light emitting diode (LED) and the audio transducer 725 may be a speaker. These devices may be directly coupled to the power supply 770 so that when activated, they remain on for a duration dictated by the notification mechanism even though the processor 760 and other components might shut down for conserving battery power. The LED may be programmed to remain on indefinitely until the user takes action to indicate the powered-on status of the device. The audio interface 774 is used to provide audible signals to and receive audible signals from the user. For example, in addition to being coupled to the audio transducer 725, the audio interface 774 may also be coupled to a microphone to receive audible input, such as to facilitate a telephone conversation. In accordance with embodiments of the present disclosure, the microphone may also serve as an audio sensor to facilitate control of notifications, as will be described below. The system 702 may further include a video interface 776 that enables an operation of peripheral device port 730 (e.g., on-board camera) to record still images, video stream, and the like. Audio interface 774, video interface 776, and keypad 735 may be operated to generate one or more messages as described herein.

A mobile computing device 700 implementing the system 702 may have additional features or functionality. For example, the mobile computing device 700 may also include additional data storage devices (removable and/or non-removable) such as, magnetic disks, optical disks, or tape. Such additional storage is illustrated in FIG. 7B by the non-volatile storage area 768.

Data/information generated or captured by the mobile computing device 700 and stored via the system 702 may be stored locally on the mobile computing device 700, as described above, or the data may be stored on any number of storage media that may be accessed by the device via the radio interface layer 772 or via a wired connection between the mobile computing device 700 and a separate computing device associated with the mobile computing device 700, for example, a server computer in a distributed computing network, such as the Internet. As should be appreciated such data/information may be accessed via the mobile computing device 700 via the radio interface layer 772 or via a distributed computing network. Similarly, such data/information may be readily transferred between computing devices for storage and use according to well-known data/information transfer and storage means, including electronic mail and collaborative data/information sharing systems.

As should be appreciated, FIGS. 7A and 7B are described for purposes of illustrating the present methods and systems and are not intended to limit the disclosure to a particular sequence of steps or a particular combination of hardware or software components.

Figure 8:
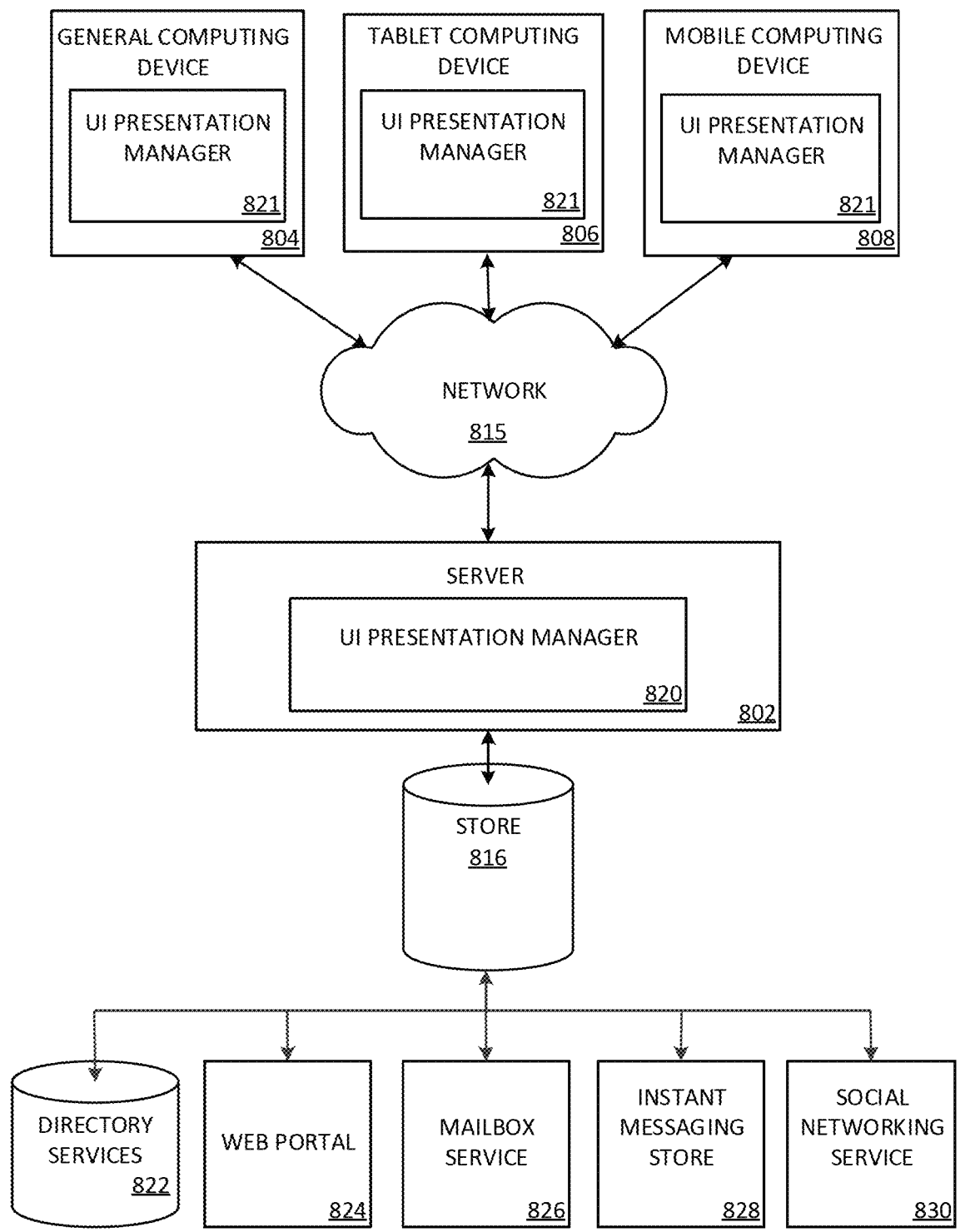
FIG. 8 is a simplified block diagram of a distributed computing system in which aspects of the present disclosure may be practiced.

FIG. 8 illustrates one aspect of the architecture of a system for processing data received at a computing system from a remote source, such as a general computing device 804 (e.g., personal computer), tablet computing device 806, or mobile computing device 808, as described above. Content displayed at server device 802 may be stored in different communication channels or other storage types. For example, various messages may be received and/or stored using directory services 822, a web portal 824, a mailbox service 826, an instant messaging store 828, or a social networking service 830. The UI Presentation Manager 821 may be employed by a client that communicates with server device 802, and/or UI Presentation Manager 820 may be employed by server device 802. The server device 802 may provide data to and from a client computing device such as a general computing device 804, a tablet computing device 806 and/or a mobile computing device 808 (e.g., a smart phone) through a network 815. By way of example, the computer system described above with respect to FIGS. 1-5 may be embodied in a general computing device 804 (e.g., personal computer), a tablet computing device 806 and/or a mobile computing device 808 (e.g., a smart phone). Any of these embodiments of the computing devices may obtain content from the store 816, in addition to receiving graphical data useable to either be pre-processed at a graphic-originating system or post-processed at a receiving computing system.

As should be appreciated, FIG. 8 is described for purposes of illustrating the present methods and systems and is not intended to limit the disclosure to a particular sequence of steps or a particular combination of hardware or software components.

Figure 9:
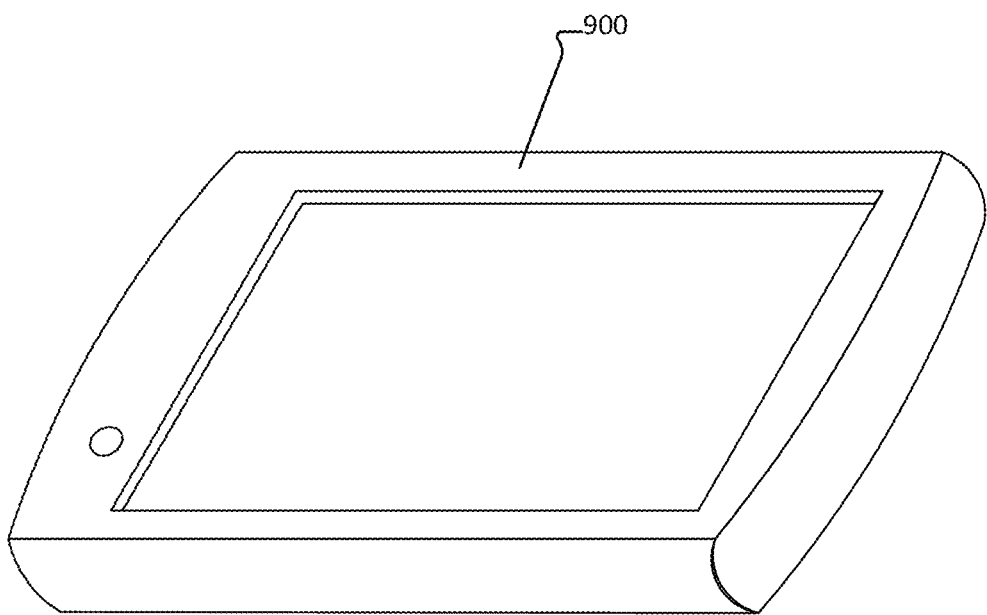
FIG. 9 illustrates a tablet computing device for executing one or more aspects of the present disclosure.

FIG. 9 illustrates an exemplary tablet computing device 900 that may execute one or more aspects disclosed herein. In addition, the aspects and functionalities described herein may operate over distributed systems (e.g., cloud-based computing systems), where application functionality, memory, data storage and retrieval and various processing functions may be operated remotely from each other over a distributed computing network, such as the Internet or an intranet. User interfaces and information of various types may be displayed via on-board computing device displays or via remote display units associated with one or more computing devices. For example, user interfaces and information of various types may be displayed and interacted with on a wall surface onto which user interfaces and information of various types are projected. Interaction with the multitude of computing systems with which embodiments of the invention may be practiced include, keystroke entry, touch screen entry, voice or other audio entry, gesture entry where an associated computing device is equipped with detection (e.g., camera) functionality for capturing and interpreting user gestures for controlling the functionality of the computing device, and the like.

As should be appreciated, FIG. 9 is described for purposes of illustrating the present methods and systems and is not intended to limit the disclosure to a particular sequence of steps or a particular combination of hardware or software components.

Aspects of the present disclosure, for example, are described above with reference to block diagrams and/or operational illustrations of methods, systems, and computer program products according to aspects of the disclosure. The functions/acts noted in the blocks may occur out of order as shown in any flowchart. For example, two blocks shown in succession may in fact be executed substantially concurrently or the blocks may sometimes be executed in the reverse order, depending upon the functionality/acts involved.

The description and illustration of one or more aspects provided in this application are not intended to limit or restrict the scope of the disclosure as claimed in any way. The aspects, examples, and details provided in this application are considered sufficient to convey possession and enable others to make and use the best mode of claimed disclosure. The claimed disclosure should not be construed as being limited to any aspect, example, or detail provided in this application. Regardless of whether shown and described in combination or separately, the various features (both structural and methodological) are intended to be selectively included or omitted to produce an embodiment with a particular set of features. Having been provided with the description and illustration of the present application, one skilled in the art may envision variations, modifications, and alternate aspects falling within the spirit of the broader aspects of the general inventive concept embodied in this application that do not depart from the broader scope of the claimed disclosure.

What is claimed is:

1. A computer system comprising:
   at least one processing unit; and
   at least one memory storing computer executable instructions that, when executed by the at least one processing unit, cause the computer system to perform a method, the method comprising:
      providing at least one element on a graphical user interface, wherein the at least one element comprises:
         a first section that comprises logic for determining whether at least one global color setting or at least one custom color setting is to be applied to the at least one element based on a global system status that indicates whether a theme is to be applied to the graphical user interface;
         a second section that comprises the at least one global color setting and is inheritable by other elements displayable by the graphical user interface; and
         a third section having the at least one custom color setting particular to the at least one element, wherein the at least one custom color setting is overridable by the at least one global color setting based on the logic of the first section;
      encoding the at least one element with at least one custom color setting;
      displaying the at least one element using the at least one custom color setting;
      receiving an indication to change a theme of the graphical user interface, wherein the theme is associated with a color scheme for the graphical user interface;
      automatically overriding the at least one custom color setting of the at least one element with at least one global color setting associated with the theme based on the logic of the first section of the at least one element; and
      displaying the at least one element in the graphical user interface using the at least one global color setting.

2. The computer system of claim 1, wherein the theme is a high-contrast theme.

3. The computer system of claim 2, wherein the at least one global color setting is compatible with the high-contrast theme.

4. The computer system of claim 1, wherein a plurality of elements is encoded with the one or more global settings, the method further comprising:
   in response to receiving the change to the theme, automatically overriding at least one custom color setting for each of the plurality of elements based on at least one global color setting associated with the theme; and
   displaying each of the plurality of elements in the graphical user interface using at least one global color setting.

5. The computer system of claim 1, wherein the encoding of the at least one element comprises:
   a first section including at least one of code for the one or more global settings and one or more references to the one or more global settings; and
   a second section including code for one or more custom settings.

6. The computer system of claim 5, the first section is a base encoding that is inheritable by one or more other elements.

7. The computer system of claim 5, wherein the one or more references to the one or more global settings refer to at least one system resource.

8. The computer system of claim 5, wherein the second section is a custom encoding specific to the at least one element.

9. A computer-implemented method for updating at least one user interface (UI) element based on a theme change, the method comprising:
   providing the at least one UI element on a graphical user interface, wherein the at least one UI element comprises:
      a first section that comprises logic for determining whether at least one global color setting or at least one custom color setting is to be applied to the at least one UI element based on a Global system status that indicates whether a theme is to be applied to the graphical user interface;
      a second section that comprises the at least one global color setting and is inheritable by other UI elements displayable by the graphical user interface; and
      a third section having the at least one custom color setting particular to the at least one UT element, wherein the at least one custom color setting is overridable by the at least one global color setting based on the logic of the first section;
   encoding the at least one UI element with at least one custom color setting;
   displaying the at least one UI element using the at least one custom color setting;
   receiving an indication to change a theme of the graphical user interface, wherein the theme is associated with a color scheme for the graphical user interface;
   automatically overriding the at least one custom color setting of the at least one UI element with at least one global color setting associated with the theme based on the logic of the first section of the at least one UI element; and
   displaying the at least one UT element in the graphical user interface using the at least one global color setting.

10. The computer-implemented method of claim 9, wherein encoding the at least one UI element with at least one custom color setting further comprises encoding the at least one UI element with a custom color setting for at least one state of the UI element, and wherein automatically overriding the at least one custom color setting of the at least one UI element with at least one global color setting associated with the theme further comprises automatically overriding the custom color setting for the at least one state of the UI element with at least one global color setting associated with the theme.

11. The computer-implemented method of claim 9, wherein the theme is a high-contrast theme.

12. The computer-implemented method of claim 11, wherein the at least one global color setting is compatible with the high-contrast theme.

13. The computer-implemented method of claim 9, wherein the encoding of the at least one UI element comprises a first section including one or more references to the one or more global settings and second section including code for one or more custom settings.

14. The computer-implemented method of claim 13, wherein the one or more references to the one or more global settings refer to at least one system resource.

15. The computer-implemented method of claim 13, wherein the first section is a base encoding that is inheritable by one or more other UI elements.

16. The computer-implemented method of claim 13, wherein the second section is a custom encoding specific to the at least one UI element.

17. A non-transitory, computer storage medium comprising computer-executable instructions that when executed by a processor perform a method of updating at least one user interface (UI) element based on a theme change, the method comprising:
 providing at least one UI element on a graphical user interface, wherein the at least one UI element comprises:
  a first section that comprises logic for determining whether at least one global color setting or at least one custom color setting is to be applied to the at least one UI element based on a global system status that indicates whether a theme is to be applied to the graphical user interface;
  a second section that comprises the at least one global color setting and is inheritable by other UI elements displayable by the graphical user interface; and
  a third section having the at least one custom color setting particular to the at least one UI element, wherein the at least one custom color setting is overridable by the at least one global color setting based on the logic of the first section;
 encoding the at least one UI element with at least one custom color setting;
 displaying the at least one UI element using the at least one custom color setting;
 receiving an indication to change a theme of the graphical user interface, wherein the theme is associated with a color scheme for the graphical user interface;
 automatically overriding the at least one custom color setting of the at least one UI element with at least one global color setting associated with the theme based on the logic of the first section of the at least one UI element; and
 displaying the at least one UI element in the graphical user interface using the at least one global color setting.

18. The non-transitory, computer storage medium of claim 17, wherein the encoding of the at least one UI element comprises:
 a first section including at least one of code for the one or more global settings and one or more references to the one or more global settings; and
 a second section including code for one or more custom settings.

19. The non-transitory, computer storage medium of claim 18, wherein the first section is a base encoding that is inheritable by one or more other UI elements.

20. The non-transitory, computer storage medium of claim 18, wherein the second section is a custom encoding specific to the at least one UI element.

* * * * *